United States Patent
Hauenschild et al.

(10) Patent No.: US 7,590,351 B2
(45) Date of Patent: Sep. 15, 2009

(54) EXTINCTION RATIO CONTROL USING A FREQUENCY SPREAD TONE TO MODULATE OPTICAL SIGNAL POWER LEVELS

(75) Inventors: Juergen Hauenschild, Bochum (DE); The-Linh Nguyen, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 540 days.

(21) Appl. No.: 11/531,563

(22) Filed: Sep. 13, 2006

(65) Prior Publication Data
US 2009/0208214 A1      Aug. 20, 2009

Related U.S. Application Data

(60) Provisional application No. 60/717,344, filed on Sep. 15, 2005.

(51) Int. Cl.
    *H04B 10/08* (2006.01)
(52) U.S. Cl. .............. 398/38; 398/25; 398/197
(58) Field of Classification Search ........ 398/25, 398/38, 135–139, 195, 197, 198; 372/30
    See application file for complete search history.

(56) References Cited

U.S. PATENT DOCUMENTS

| | | | | |
|---|---|---|---|---|
| 5,502,298 A * | 3/1996 | Geller | ............ | 250/205 |
| 5,535,038 A * | 7/1996 | Hinch | ............ | 398/182 |
| 6,414,974 B1 * | 7/2002 | Russell et al. | ............ | 372/38.02 |
| 6,459,716 B1 * | 10/2002 | Lo et al. | ............ | 372/50.1 |
| 6,583,910 B1 * | 6/2003 | Satoh | ............ | 398/182 |
| 6,993,459 B2 * | 1/2006 | Carrick | ............ | 702/189 |
| 7,263,287 B2 * | 8/2007 | Xu | ............ | 398/27 |
| 2003/0141876 A1 * | 7/2003 | Mahgerefteh et al. | ........ | 324/537 |
| 2005/0008280 A1 * | 1/2005 | Howley | ............ | 385/14 |

* cited by examiner

*Primary Examiner*—Dzung D Tran
(74) *Attorney, Agent, or Firm*—Workman Nydegger (57) ABSTRACT

An optical transmitter that controls the extinction ratio by modulating a power level of an optical signal using a frequency spread tone. An electro-optic transducer driver generates an electrical signal that is to be converted into an optical signal. Meanwhile, a tone generator generates an electrical tone having a relatively narrow frequency spectrum. A frequency spreading circuit frequency spreads the electrical tone. A modulator modulates a power level of the electrical signal using the frequency spread electrical tone. An electro-optic transducer then converts the modulated electrical signal into a corresponding optical signal. An optoelectronic transducer recovers the modulated electrical signal by monitoring the optical signal. The tone is then recovered from the signal, and demodulated. The demodulated tone is then used to control the extinction ratio.

20 Claims, 5 Drawing Sheets

EXTINCTION RATIO CONTROL USING A FREQUENCY SPREAD TONE TO MODULATE OPTICAL SIGNAL POWER LEVELS

CROSS-REFERENCE TO RELATED APPLICATIONS

This application claims the benefit of U.S. Provisional Application No. 60/717,344, filed Sep. 15, 2005, which is incorporated herein by reference in its entirety.

BACKGROUND

1. The Field of the Invention

The present invention relates generally to optical transmitters. More specifically, the present invention relates to mechanisms for controlling the extinction ratio of an optical signal by modulating the optical signal levels using a frequency spread tone.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Information is conveyed over an optical fiber by transmitting different optical intensities on the fiber. A relatively high optical power level is transmitted onto the optical fiber to assert one binary value onto the fiber. A relatively low optical power level is transmitted onto the optical fiber to assert the opposite binary value. There is also an average optical power somewhere between the high optical power and the low optical power. The high optical power is obtained by asserting a higher current to the laser. The low optical power is obtained by asserting a lower current to the laser. The laser is not turned off because it takes significant time to saturate a laser to the point where it begins to lase if starting from a laser that is off. In fact, if the current through the laser were to drop below a certain threshold current, it can take much longer to transition to the high optical intensity. In high data rate applications, this could cause significant jitter and possible degradation of the signal. Accordingly, even the low current that enables the low optical intensity should be kept above the threshold current of the laser. If this constraint is met, the laser can transition quickly from the high optical level to the low optical level, and vice versa.

An additional constraint to the high and low optical levels is referred to as the "extinction ratio". The extinction ratio is the ratio of the high optical power level to the low optical power level. The optical high and low power levels are obtained by modulating the current between the higher and lower currents. Typical extinction ratio values range from perhaps 6 dB to 12 dB, with higher levels generally being better but more costly in terms of power requirements.

Figure 4:
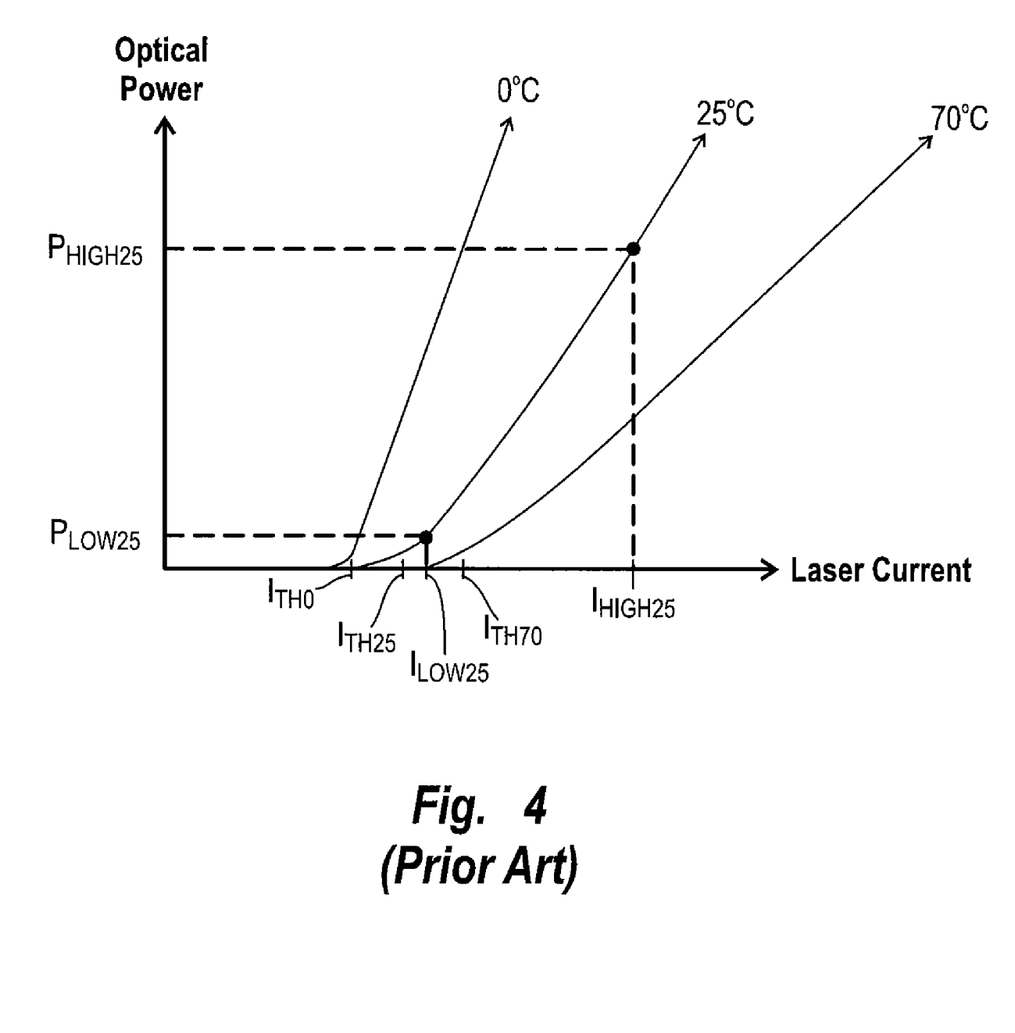
FIG. 4 illustrates a conventionally known relation between optical power, laser current and temperature.

However, maintaining of a proper extinction ratio is more complex than simply statically determining an appropriate high optical level and an appropriate low optical level, and keeping with that level. Varying temperatures have a profound effect upon the extinction ratio. FIG. 4 illustrates approximate laser current versus optical power curves for several different temperatures including 0, 25 and 70 degrees Celsius. The threshold current for 0, 25 and 70 degrees Celsius are illustrated as $I_{TH0}$, $I_{TH25}$ and $I_{TH70}$. The difference in the curves for varying temperatures is exaggerated to illustrate the principles of temperature dependency in the curve. Each laser will have slightly different curves shapes and temperatures dependencies. However, regardless of the laser type and make, the laser tends not to emit significant optical power if the supplied current is below the threshold current. In addition, for all lasers, as temperature rises, threshold current increases and the slope of the curve in the linear region above the threshold current (i.e., the slope efficiency) reduces.

FIG. 4 also shows the low optical level $P_{LOW25}$ for 25 degrees Celsius and the corresponding current $I_{LOW25}$ needed to attain that low power level at 25 degrees Celsius, and a high optical level $P_{HIGH25}$ also for 25 degrees Celsius and the corresponding current $I_{HIGH25}$ needed to attain that high power level at 25 degrees Celsius.

As temperature rises, the threshold current needed for the laser to transmit any significant degree of optical power rises. In addition, the slope of the curve in the linear region above the saturation current becomes less steep. This means that if the temperature were to fall or rise, the optical power emitted by the laser given a constant current will also change. Accordingly, in order to maintain a proper extinction ratio, the extinction ratio is periodically checked and adjusted if needed. This allows the optical transmitter or transceiver to operate under wide-ranging temperature conditions without introducing inordinate amounts of jitter into the transmitted signal, and while maintaining a roughly constant extinction ratio.

Figure 5:
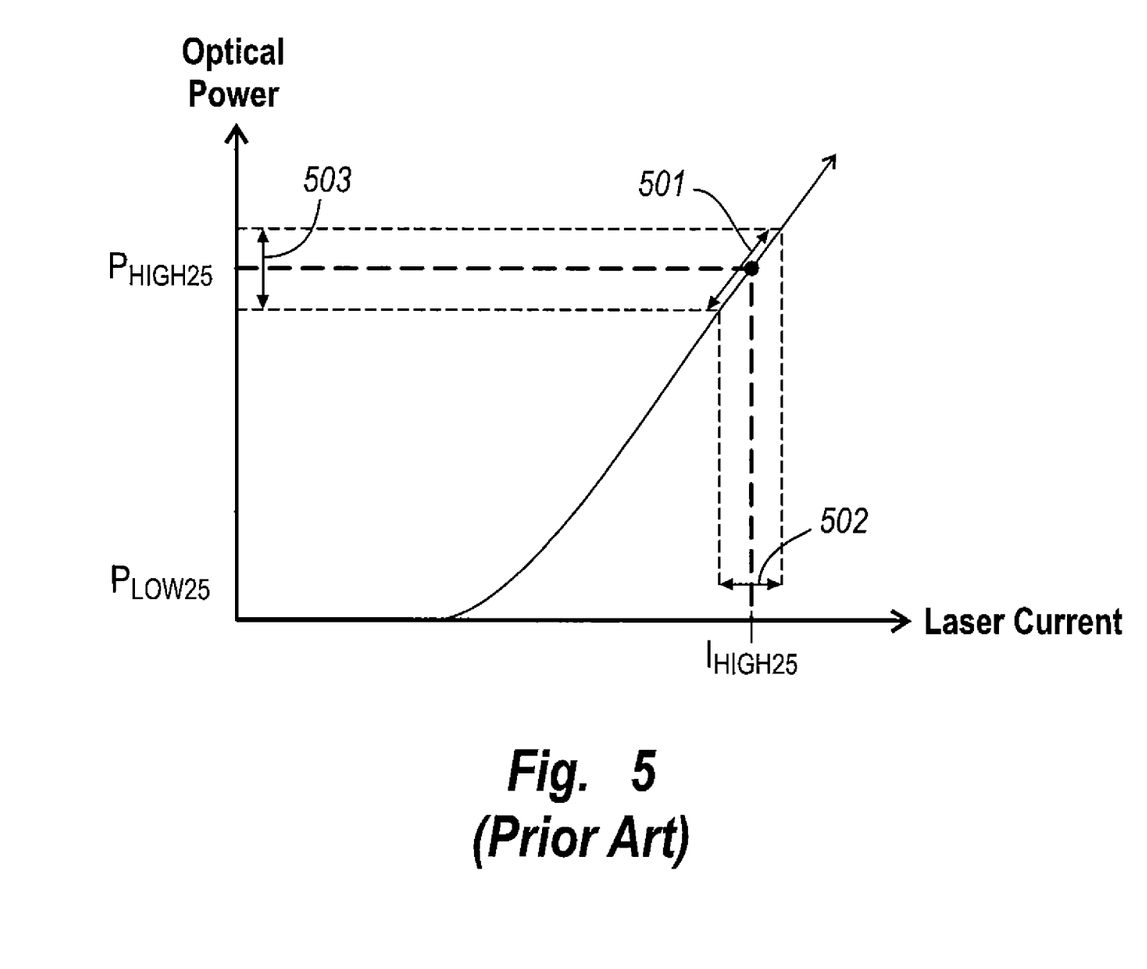
FIG. 5 illustrates the optical power versus laser current curve subject to modulation of its high power level in accordance with the prior art.

One conventional mechanism for controlling the extinction ratio is to introduce a tone modulated onto the high current limit. This may be seen from FIG. 5, in which a varying current tone is modulated around the high current needed to generate the high optical level. This tone modulation is represented in FIG. 5 by the smaller bi-directional arrow 501 traveling along the optical power versus laser current curve. For clarity, only the optical power and laser current curve for one temperature (i.e., 25 degrees Celsius) is shown in FIG. 5.

The current modulation on the high current $I_{HIGH25}$ as represented by bi-directional arrow 502 thus causes a corresponding optical power modulation on the high power level $P_{HIGH25}$ as represented by bi-directional arrow 503. Given a relatively constant current modulation 502, the magnitude of the optical high power level modulation 503 is a function of the slope of the laser current versus optical power curve in the linear region. From this information, the magnitude of the current change $I_{MOD}$ needed to transition from a high to a low optical power level may be calculated.

The frequency spectrum of the current modulation 502 (and thus also the optical modulation 503) is generally a single tone, or as close to a single tone as the hardware is capable of generating. However, the frequency spectrum of the data represented by the optical signal or other ambient noise can interfere with the single tone thereby making it difficult to detect the optical tone magnitude, and thereby could disrupt the ability to adjust the modulation current $I_{MOD}$ to the appropriate levels. Furthermore, the single tone frequency may interfere with the proper functioning of surrounding circuitry that is sensitive to the frequency of the tone.

Accordingly, what would be advantageous is a mechanism for controlling the extinction ratio with less susceptibility to ambient noise and the surrounding data frequency characteristics, and that is less interfering with surrounding circuitry.

BRIEF SUMMARY

The foregoing problems with the prior state of the art are overcome by the principles of the present invention, which relate to an optical transmitter (or transceiver) that controls the extinction ratio by modulating a power level of an optical signal using a frequency spread tone. By using the frequency spread tone, instead of a single tone, the tone may even be within the same frequency spectrum as the data while still allowing for recovery of the tone, thereby allowing for more flexibility on the frequency range of the spread tone. Furthermore, the spread tone contributes less interference to other portions of the optical transmitter that are perhaps susceptible to interference in the frequency of the tone before frequency spreading.

The optical transmitter includes an electro-optic transducer driver configured to generate an electrical signal that is to be converted into an optical signal, the electrical signal having a plurality of power levels including a high power level and a low power level. Meanwhile, a tone generator generates an electrical tone having a relatively narrow frequency spectrum. A frequency spreading circuit receives and frequency spreads the electrical tone. A modulator modulates one of the power levels of the electrical signal using the frequency spread electrical tone. An electro-optic transducer then converts the modulated electrical signal into a corresponding optical signal.

An optoelectronic transducer recovers the modulated electrical signal by monitoring the optical signal. A demodulator recovers the frequency spread tone from the recovered modulated electrical signal. A tone recovery circuit recovers the spread tone from the recovered electrical signal. A tone demodulator then demodulates the tone. An extinction ratio controller component then uses the demodulated tone to adjust the extinction ratio of the electrical signal.

Accordingly, an optical power level of the optical signal is modulated with a frequency spread tone thereby improving extinction ratio control. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The principles of the present invention relate to an optical transmitter that controls the extinction ratio by modulating a power level of an optical signal using a frequency spread tone. By using the frequency spread tone, instead of a single tone, the tone may even be within the same frequency spectrum as the data thereby allowing for more flexibility on the frequency range of the spread tone. Furthermore, the spread tone contributes less interference to other portions of the optical transmitter that are perhaps susceptible to interference in the frequency of the tone before frequency spreading.

Figure 1:
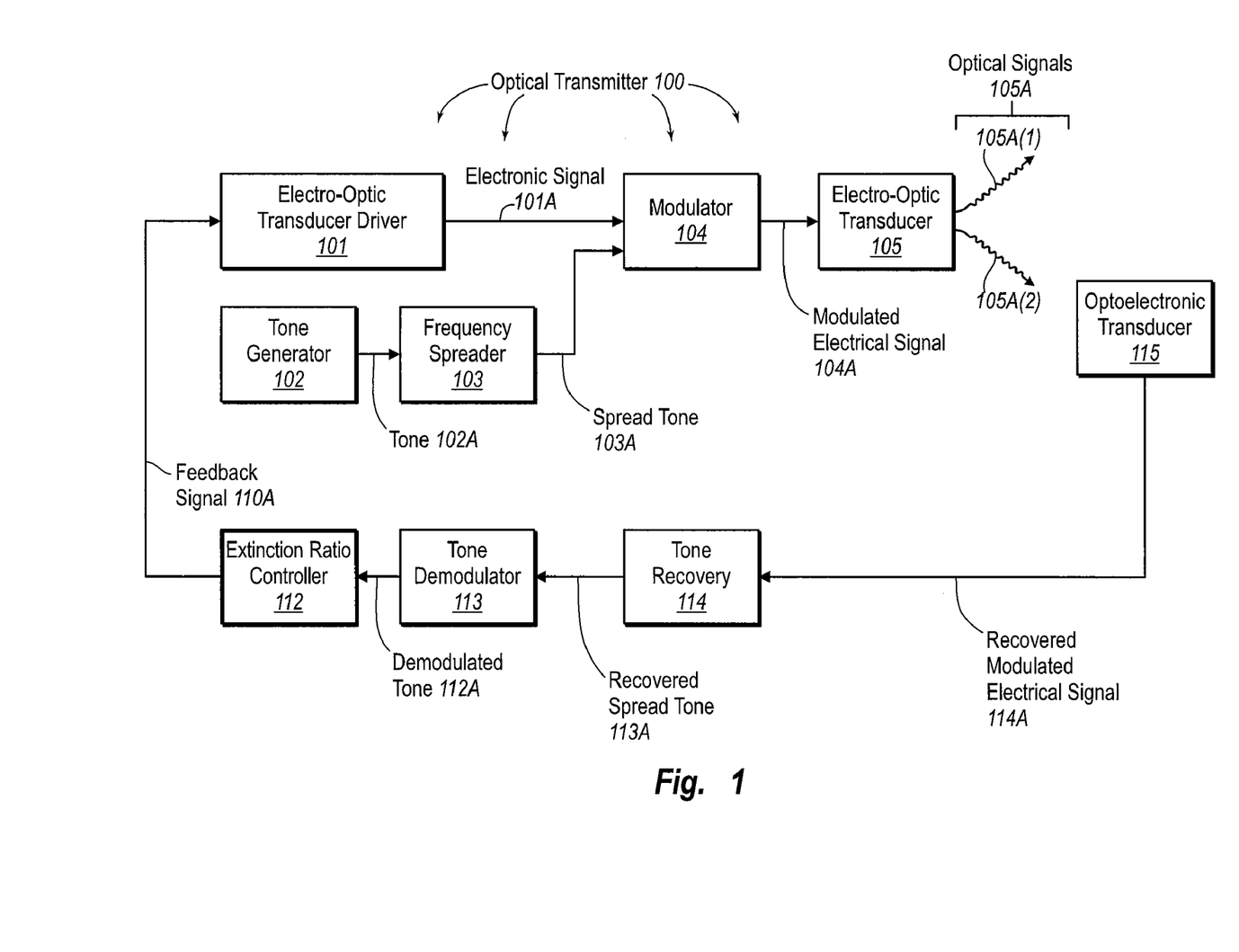
FIG. 1 schematically illustrates an example of an optical transmitter that may control its extinction ratio using a frequency spread tone modulated on a power level of the optical signal in accordance with the principles of the present invention.

FIG. 1 illustrates an optical transmitter 100 in which the principles of the present invention may be employed. While the optical transmitter 100 will be described in some detail, the optical transmitter 100 is described by way of illustration only, and not by way of restricting the scope of the invention. The principles of the present invention are suitable for 1G, 2G, 4G, 10G and higher bandwidth fiber channels as sensitivity to operational circumstances increases. Furthermore, the principles of the present invention may be implemented in laser transmitter/receivers of any form factor such as XFP, SFP and SFF, without restriction. The principles of the present invention may also be applied to an optical transmitter in any environment, even in an environment that includes an optical receiver. Accordingly, the principles of the present invention may be implemented in an optical transceiver environment.

Figure 2:
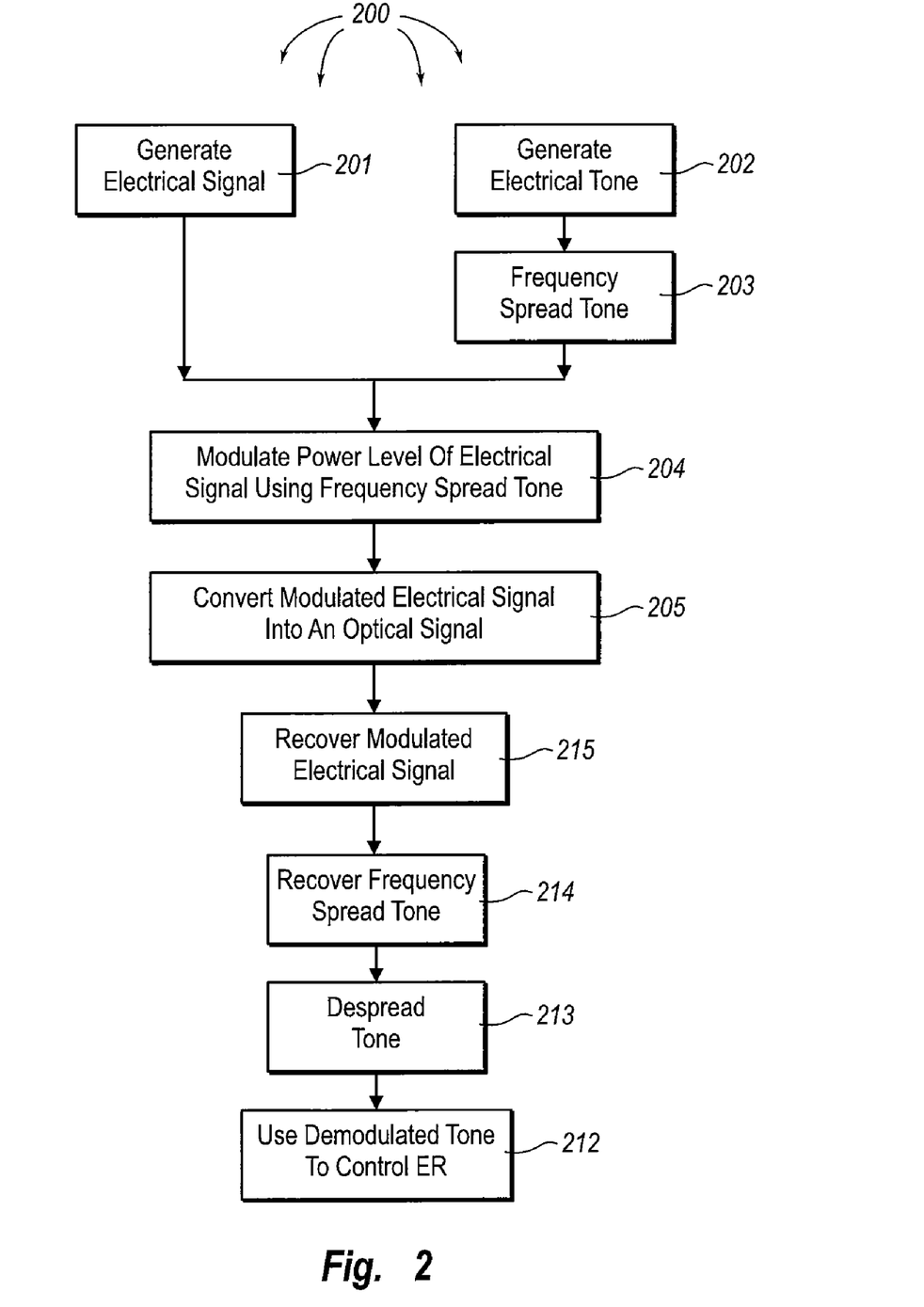
FIG. 2 illustrates a flowchart of a method for controlling an extinction ratio using a frequency spread tone modulated on a power level of an optical signal in accordance with the principles of the present invention.

FIG. 1 schematically illustrates an optical transmitter 100 that controls its extinction ratio using a frequency spread tone modulated on a power level of an optical signal in accordance with the principles of the present invention. FIG. 2 illustrates a flowchart of a method 200 for the optical transmitter of FIG. 1 to automatically control an extinction ratio of an optical signal. As the method 200 of FIG. 2 may be performed by the optical transmitter 100 of FIG. 1, FIGS. 1 and 2 will now be described with frequent reference to each other.

The method 200 is illustrated as including acts 201 through 205 and 212 through 215, while the optical transmitter 100 is illustrated as including components 101 through 105 and 112 through 115. In the described embodiment, components 101 through 105 and 112 through 115 respectively perform corresponding acts 201 through 205 and 212 through 215. The components in FIG. 1 are illustrated as being discrete components. However, the components may each be fabricated on one or more chips. Furthermore, some of the components may overlap circuitry with yet other components. For example, the extinction ratio controller 112 may be a component of the electro-optic transducer driver 101. A specific example circuit will be described in greater detail with respect to FIG. 3.

An electro-optic transducer driver 101 generates an electrical signal 101A that is to be converted into an optical signal (act 201). If the electro-optic transducer 105 is a laser, then the electro-optic transducer driver 101 may be a laser driver. If the electro-optic transducer 105 is a Vertical Cavity Surface Emitting Laser (VCSEL), then the electro-optic transducer driver 101 may be a laser driver suitable for VCSEL. If the electro-optic transducer 105 is a Light Emitting Diode (LED), then the electro-optic transducer driver 101 may be an LED driver.

The electrical signal 101A is the high speed data that is being transmitted by the optical transmitter 100. As previously mentioned with respect to FIGS. 4 and 5, the electrical signal 101A typical has a number of power levels including a high power level and a low power level. The high power level may correspond to a current level that when converted to an optical signal corresponds to the optical high power level interpretable as one binary value. The low power level may correspond to a current level that when converted to an optical signal corresponds to the optical low power level interpretable as the opposite binary value. The electrical signal 101A may also have other intermediate power levels such as, for example, an average power level.

Meanwhile, a tone generator 102 generates an electrical tone 102A having a relatively narrow frequency spectrum (act 202). The tone generator 102 may be, for example, an oscillator, a clock divider or multiplier, or any other component capable of generating a tone having a relatively narrow frequency spectrum. The magnitude of the tone will be reflected in the magnitude of the modulation of the power level of the optical signal, which will facilitate control of the extinction ratio. For example, referring to FIG. 5, the magnitude of the modulation 502 of the high current level affects the magnitude of the modulation 503 of the high optical level.

A frequency spreading circuit 103 is coupled to the tone generator 102 so as to receive and frequency spread the electrical tone (act 203) to generate a frequency spread tone 103A. The frequency spreading circuit 103 may be any spreading circuit including, for example, a Pseudo Random Bit Sequence (PRBS) generator driven by the electrical tone, or a Code Division Multiple Access (CDMA) encoder. The frequency spreading circuit 103 is configured to generate frequency spread electrical signals that are largely non-harmonics of the electrical tone input to the frequency spreading circuit 103.

A modulator 104 receives the electric signal 101A and the frequency spread tone 103A, and modulates one of the power levels of the electrical signal 101A using the frequency spread electrical tone 103A (act 204). For instance, the modulator 104 may be configured to modulate the high power level of the electrical signal 101A, the low power level of the electrical signal 101A, and/or one or more intermediate power levels (e.g., the average power level) of the electrical signal.

An electro-optic transducer 105 receives the modulated electrical signal and converts the modulated electrical signal into a corresponding optical signal 105A (act 205). The electro-optic transducer 105 may be, for example, a Light Emitting Diode (LED), or a laser such as a Vertical Cavity Surface Emitting Laser (VCSEL).

Some of the optical signal 105A(1) may be emitted into an optical fiber. An optoelectronic transducer 115 is positioned to receive the other portion of the optical signal 105A(2). The optoelectronic transducer 115 recovers the modulated electrical signal 104A subject to possibly some distortion (act 215). This potentially distorted version of the modulated electrical signal 104A will be referred to as the recovered modulated electrical signal 114A. The optoelectronic transducer 115 may be, for example, a monitor photodiode.

A tone recovery circuit 114 receives the recovered modulated electrical signal 114A and recovers at least a distorted version of the frequency spread tone 113A (act 214). A tone demodulator circuit 113 receives the recovered frequency spread tone 113A and generates a demodulated tone 112A from the recovered frequency spread tone (act 213).

An extinction ratio control component 112 receives the demodulated tone 112A and uses the demodulated tone to control an extinction ratio for the optical signal using a feedback signal 110A (act 212). The amplitude of the demodulated tone represents an error in the ideal extinction ratio. The extinction ratio control component 112 may thus use this signal to adjust the extinction ratio to thereby reduce the magnitude of the demodulated tone.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

Accordingly, the principles of the present invention permit control of the extinction ratio by modulating a power level of an optical signal using a frequency spread tone. By using the frequency spread tone, instead of a single tone, the tone may even be within the same frequency spectrum as the data while still allowing for recovery of the tone, thereby allowing for more flexibility on the frequency range of the spread tone. Furthermore, the spread tone contributes less interference to other portions of the optical transmitter that are perhaps susceptible to interference in the frequency of the tone before frequency spreading.

Figure 3:
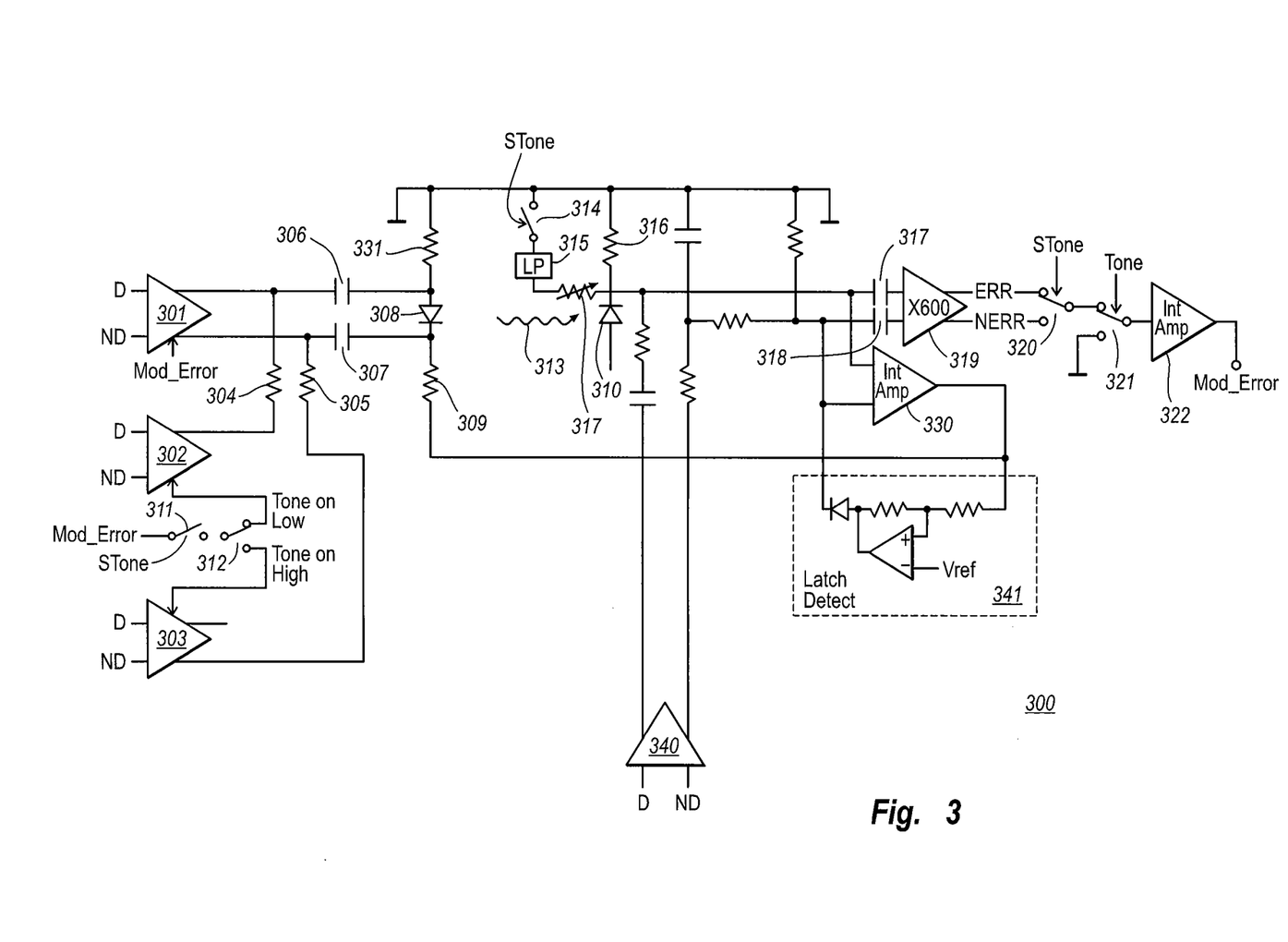
FIG. 3 illustrates a specific circuit embodiment of the general principles of the optical transceiver schematically illustrated in FIG. 1.

FIG. 3 illustrates a specific circuit embodiment 300 that may implement the general principles of the present invention described above with respect to FIGS. 1 and 2. The signals D and ND are embodiments of the electrical signal 101A represented in differential form. Signals D and ND are the actual high speed data to be transmitted by the optical transmitter. The signals D and ND are provided to data amplifier 301, which generates an amplified form of the differential data signal. The gain of the amplifier 301 is adjustable by the error signal Mod_Error. The differential voltage provided at the output of the data amplifier 301 is AC coupled through capacitors 306 and 307 to each terminal of a laser diode 308. Accordingly, by changing the signal Mod_Error, the modulation current of the laser is likewise changed. The extinction ratio of the laser diode 308 may be altered by altering both the modulation current and the bias current of the laser.

A frequency spread tone is modulated onto the high amplified high speed data signal using amplifier 302 when modulating on the high power level, and amplifier 303 when modulating on the low power level. The high speed data D and ND is provided to both amplifiers 302 and 303. Switch 312 is shown as being set to the amplifier 302 indicating that modulation is configured on the high power level. Modulation on the low power level could be enabled by setting switch 312 towards the amplifier 303. The frequency spread tone is represented by signal STone. When the frequency spread signal STone is low, the differential amplifier 302 does not generate a voltage differential. When the frequency spread signal STone is high, the differential amplifier 302 generates a slight voltage which is applied through resistor 304 to the upper output terminal of the differential amplifier 301. By sizing the resistor 304 as compared to the intrinsic output resistance of the amplifier 301, the ratio of the tone modulation to the total modulation may be set. The amplifier 303 works is a similar fashion with respect to resistor 305. Thus, in this manner, an electrical signal is modulated with a frequency spread tone on the low power level.

The AC component of this signal is provided to a laser diode 308 which is also provided with a bias current so as to emit an optical signal 313. This optical signal is then monitored by monitor photodiode 310. The cathode terminal of the monitor diode 310 generates a signal that represents the recovered frequency spread tone. This is due to other components coupled to the cathode terminal. Specifically, the series combination of the frequency spread tone controlled switch 314 and low pass filter in combination with the resistors 316 and 317 enables this when the ratio of the resistances of the resistors 316 and 317 is approximately equal to the ratio between the magnitudes of the tone modulation and the total modulation.

The AC component of the recovered frequency spread tone is provided through capacitors 317 and 318 to amplifier 319, which generates an amplified form of the frequency spread tone. The frequency spread tone is demodulated using switch 320. The demodulated tone is then provided through switch 321 to an integrating amplifier 322. The switch 321 is controlled by the tone provided to the frequency spreader, rather than the frequency spread tone, to account for transient startup conditions. The modulation error is then provided in the form of a DC signal Mod_Error at the output terminal of the integrating amplifier 322. Amplifier 340 is used to cancel the data signals that get coupled to the monitor photodiode 310 minimizing their interference on amplifier 319.

As the modulation decreases below where it should be, the Mod_Error signal will change in one direction, and thereby cause the modulation current to change by controlling the gain of the data amplifier 301 accordingly. Similarly, as the modulation increases below where it should be, the Mod_Error signal will change in the other direction, and thereby cause the modulation current to change in the appropriate opposite direction. Thus, the demodulated form of the recovered frequency spread tone may be used to control modulation current.

The frequency spread tone may also be used to control the laser bias current by controlling the voltage level at the anode terminal of the laser diode 308. Specifically, the recovered frequency spread tone is provided directly to an integrating amplifier, which generates a DC voltage that increases as the frequency spread tone increases, and decreases as the frequency spread tone decreases. This causes an appropriate DC voltage change through resistor 331 at the anode terminal of the laser diode 308. Accordingly, the laser bias current is also changed as a result of the frequency spread tone. Accordingly, the frequency spread tone may be used to control the extinction ratio of the optical transmitter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for an optical transmitter to automatically control an extinction ratio of an optical signal, the method comprising the following:
   an act of generating an electrical signal that is to be converted into an optical signal, the electrical signal having a plurality of power levels including a high power level and a low power level;
   an act of generating an electrical tone having a relatively narrow frequency spectrum;
   an act of using a frequency spreading circuit to frequency spread the electrical tone;
   an act of modulating one of the plurality of power levels of the electrical signal using the frequency spread electrical tone;
   an act of converting the modulated electrical signal into an optical signal using an electro-optic transducer;
   an act of monitoring the optical signal using an optoelectronic transducer to recover at least a distorted version of the modulated electrical signal;
   an act of recovering at least a distorted version of the frequency spread tone from the recovered modulated electrical signal;
   an act of demodulating the frequency spread tone; and
   an act of using the demodulated tone to control an extinction ratio for the optical signal.

2. A method in accordance with claim 1, wherein the optical transmitter is an optical transceiver.

3. A method in accordance with claim 1, wherein the frequency spreading circuit is a Pseudo Random Bit Sequence (PRBS) generator driven by the electrical tone.

4. A method in accordance with claim 1, wherein the frequency spreading circuit is a Code Division Multiple Access (CDMA) encoder.

5. A method in accordance with claim 1, wherein the frequency spreading circuit is configured to generate frequency spread electrical signals that are largely non-harmonics of the electrical tone input to the frequency spreading circuit.

6. A method in accordance with claim 1, wherein the act of modulating one of the plurality of power levels of the electrical signal using the frequency spread electrical tone comprises the following:
   an act of modulating the high power level of the electrical signal using the frequency spread electrical tone.

7. A method in accordance with claim 1, wherein the act of modulating one of the plurality of power levels of the electrical signal using the frequency spread electrical tone comprises the following:
   an act of modulating the low power level of the electrical signal using the frequency spread electrical tone.

8. A method in accordance with claim 1, wherein the plurality of power levels further includes one or more intermediate power levels, wherein the act of modulating one of the plurality of power levels of the electrical signal using the frequency spread electrical tone comprises the following:
   an act of modulating one of the intermediate power levels of the electrical signal using the frequency spread electrical signal.

9. A method in accordance with claim 1, wherein the electro-optic transducer is a Light Emitting Diode (LED).

10. A method in accordance with claim 1, wherein the electro-optic transducer is a laser.

11. An optical transmitter comprising the following:
    an electro-optic transducer driver configured to generate an electrical signal that is to be converted into an optical signal, the electrical signal having a plurality of power levels including a high power level and a low power level;

a tone generator configured to generate an electrical tone having a relatively narrow frequency spectrum;

a frequency spreading circuit coupled to the tone generator so as to receive and frequency spread the electrical tone;

a modulator configured to receive the electric signal and the frequency spread tone, and modulate one of the plurality of power levels of the electrical signal using the frequency spread electrical tone;

an electro-optic transducer configured to receive the modulated electrical signal and convert the modulated electrical signal into a corresponding optical signal;

an optoelectronic transducer configured to recover at least a distorted version of the modulated electrical signal by monitoring the optical signal;

a tone recovery circuit configured to receive the recovered modulated electrical signal and recover at least a distorted version of the frequency spread tone from the recovered modulated electrical signal;

a tone demodulator circuit configured to demodulate the frequency spread tone;

an extinction ratio control component configured to use the demodulated tone to control an extinction ratio for the optical signal.

12. An optical transmitter in accordance with claim 11, wherein the optical transmitter is an optical transceiver.

13. An optical transmitter in accordance with claim 11, wherein the frequency spreading circuit is a Pseudo Random Bit Sequence (PRBS) generator driven by the electrical tone.

14. An optical transmitter in accordance with claim 11, wherein the frequency spreading circuit is a Code Division Multiple Access (CDMA) encoder.

15. An optical transmitter in accordance with claim 11, wherein the frequency spreading circuit is configured to generate frequency spread electrical signals that are largely non-harmonics of the electrical tone input to the frequency spreading circuit.

16. An optical transmitter in accordance with claim 11, wherein the modulator is configured to modulate the high power level of the electrical signal using the frequency spread electrical tone.

17. An optical transmitter in accordance with claim 11, wherein the modulator is configured to modulate the low power level of the electrical signal using the frequency spread electrical tone.

18. An optical transmitter in accordance with claim 11, wherein the plurality of power levels further includes one or more intermediate power levels, and the modulator is configured to modulate one of the intermediate power levels of the electrical signal using the frequency spread electrical signal.

19. An optical transmitter in accordance with claim 11, wherein the electro-optic transducer is a Light Emitting Diode (LED).

20. An optical transmitter in accordance with claim 11, wherein the electro-optic transducer is a laser.

* * * * *

UNITED STATES PATENT AND TRADEMARK OFFICE
CERTIFICATE OF CORRECTION

PATENT NO. : 7,590,351 B2  Page 1 of 1
APPLICATION NO. : 11/531563
DATED : September 15, 2009
INVENTOR(S) : Hauenschild et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this

Twenty-first Day of September, 2010

David J. Kappos
*Director of the United States Patent and Trademark Office*